Feb. 21, 1939.                E. J. MARTIN                2,147,711
                               DYNAMOMETER
                        Filed June 14, 1933           3 Sheets-Sheet 1

Inventor
Edward J. Martin
By Blackmore, Spencer & Flint
Attorneys

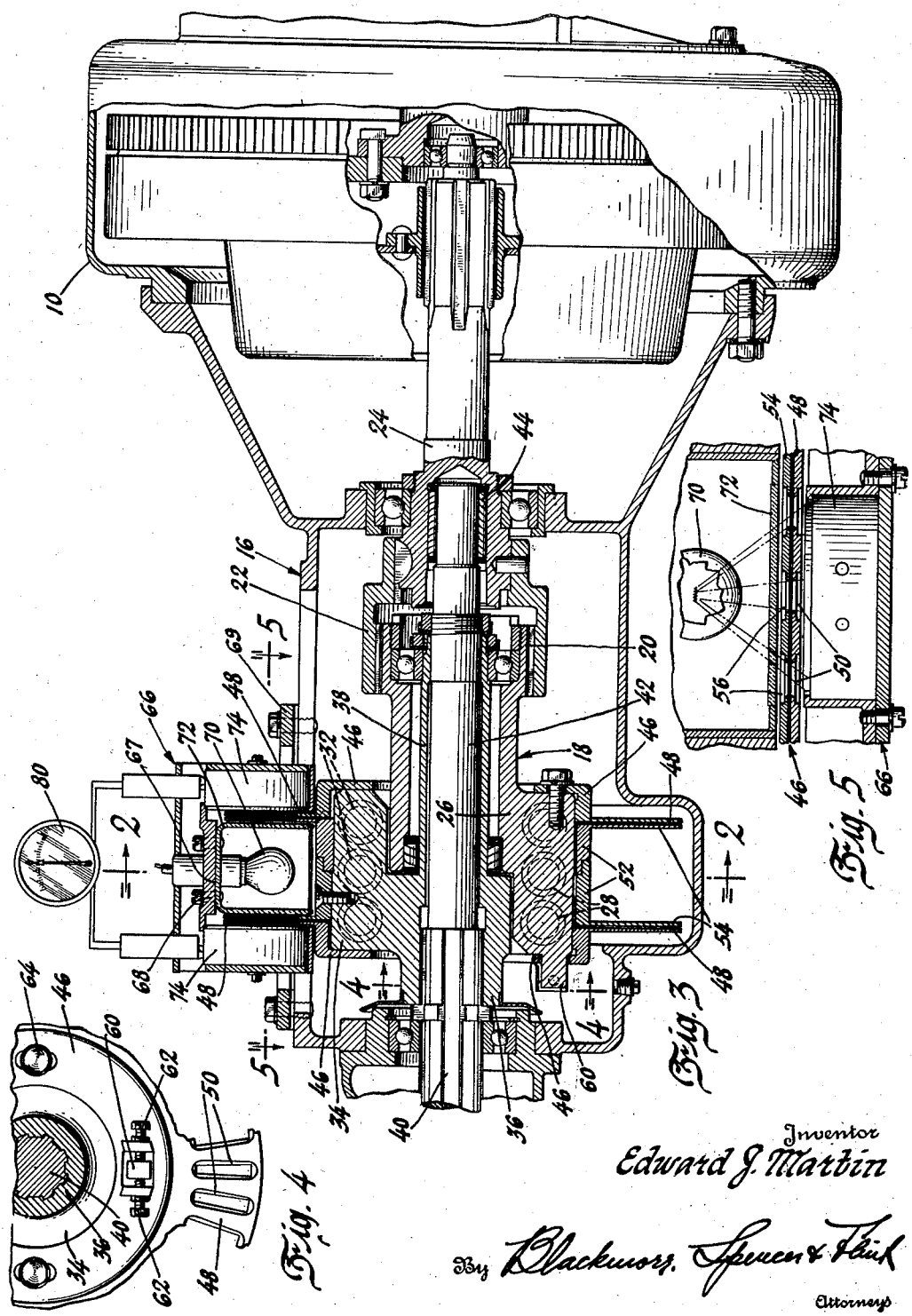

Patented Feb. 21, 1939

2,147,711

UNITED STATES PATENT OFFICE 2,147,711

DYNAMOMETER

Edward J. Martin, Ferndale, Mich., assignor, by mesne assignments, to General Motors Corporation, Detroit, Mich., a corporation of Delaware Application June 14, 1933, Serial No. 675,729

2 Claims. (Cl. 265—25)

This invention has to do with meters. The meter is herein disclosed as applied to the measurement of torque but may be used to measure other quantities.

The meter comprises two spring connected rotatable members arranged in the line of drive, one connected to the source of power and the other to the load. The members carry shutters having openings normally out of register but adapted to come into register as the result of relative rotation. This relative rotation is produced in the present instance by changes in torque. The openings are of such shape that the overlapping varies directly with the angular displacement of the shutters. Measurement of the displacement is accomplished by arranging a source of light in position to project light through the alined openings onto a suitable light sensitive element, preferably a photoelectric cell. I have preferred to employ a photoelectric cell capable of directly changing light into an electric current so that the current passing through the cell may be used directly to operate an electrical indicating instrument, preferably one of the type equipped with a scale having a central zero reading so as to permit reading both increasing and decreasing torque.

Other details of the invention will be described in the following specification.

In the drawings:

Figure 3 is a section on line 3—3 of Figure 2.

Figure 4 is a fragmentary view on line 4—4 of Figure 3.

Figure 5 is a horizontal transverse section through the indicating apparatus on line 5—5 of Figure 3.

Figure 1:
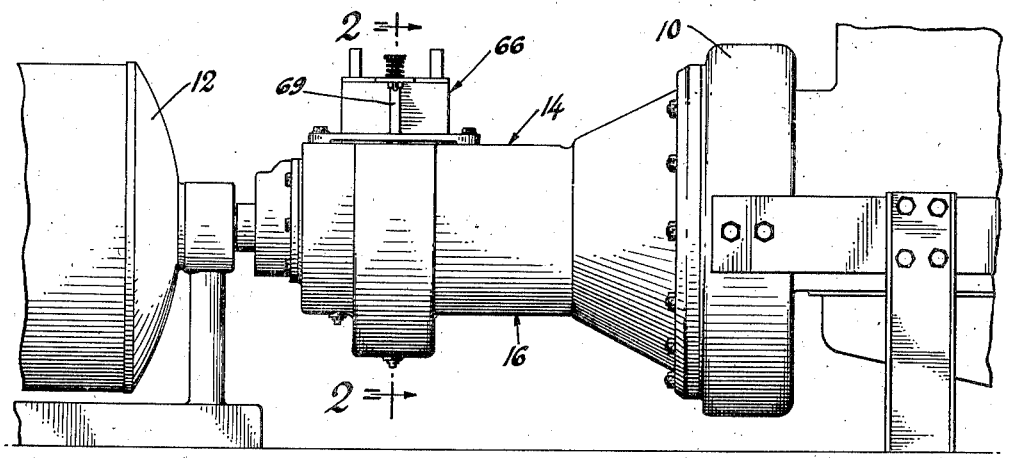
Figure 1 is a side elevation showing the use of the torque meter to measure the torque of an engine driving a dynamometer.
Figure 2:
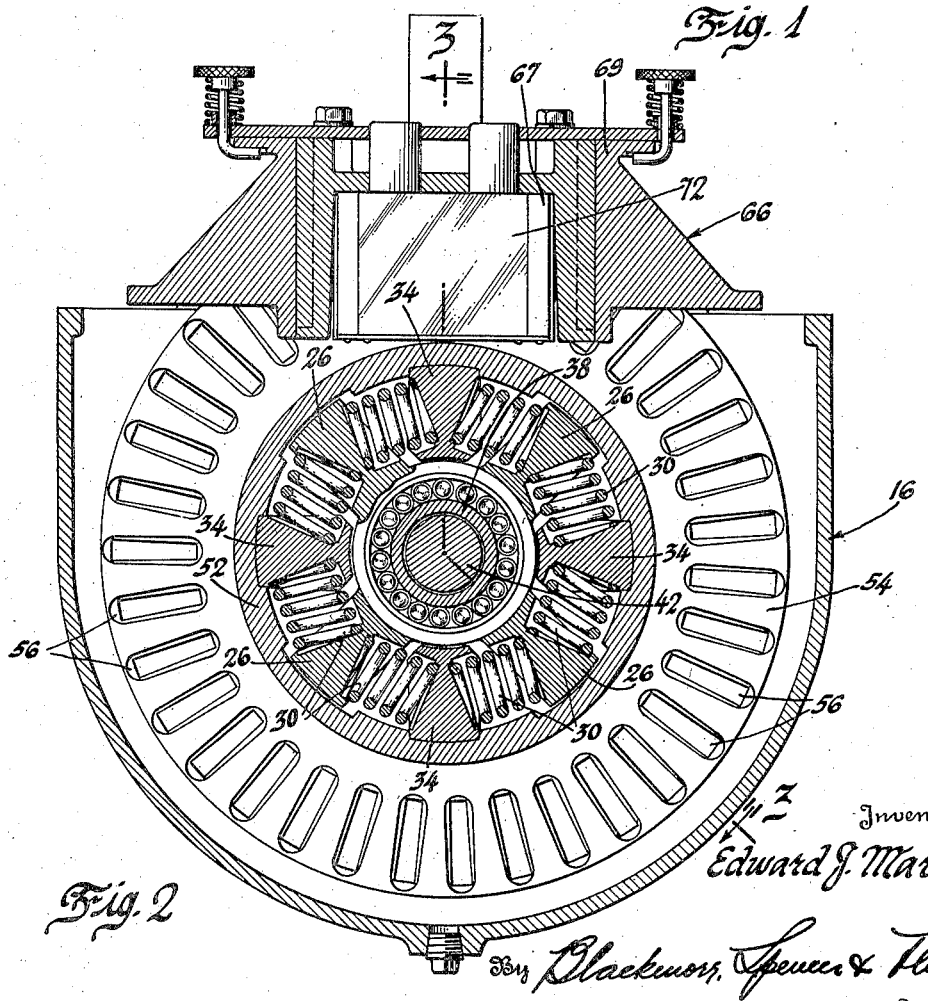
Figure 2 is a section on line 2—2 of Figure 1.
Figure 6:
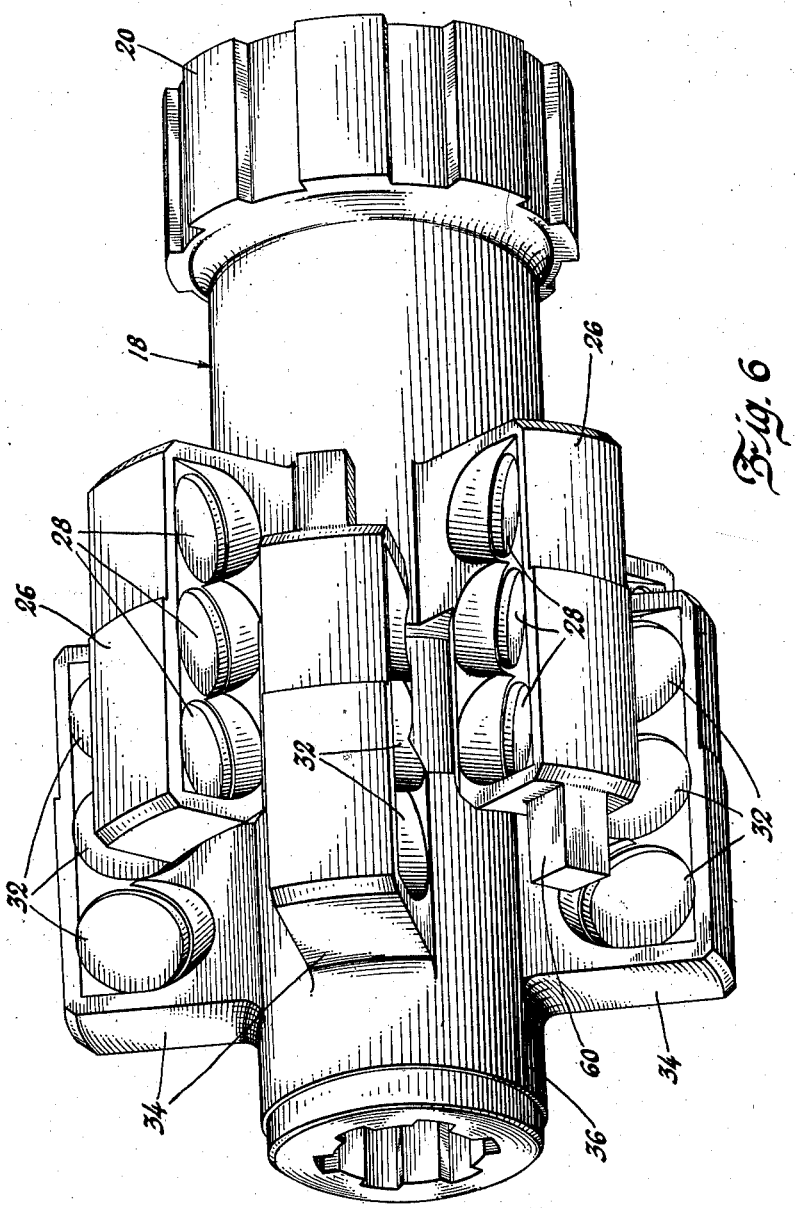
Figure 6 is a perspective view of the driving and driven members of the torque meter separated slightly in a longitudinal direction from their position when in use.

In Figure 1 I have shown at 10 an engine and at 12 a load applied to the engine. This load may take the form of a conventional dynamometer. Between the engine and the load I have arranged my torque meter 14. The meter comprises a housing 16 which may be of the same shape as the housing of the transmission with which the engine is customarily equipped. The housing 16 is suitably secured to the housing of the engine 10. The torque meter consists essentially of two spring connected shaft-like members 18 and 36, best shown in Figure 6. Member 18 is provided with splines 20 so that it may be driven by coupling 22 keyed to stub shaft 24 which, in turn, is driven in any suitable manner from the engine crankshaft. The other end of member 18 is equipped with spline-like members 26 recessed on their sides at 28 to receive coil springs 30 having their other ends received in recesses 32 provided in splines 34, formed on the driven member 36. The driven member 36 is provided with a sleeve-like extension 38. The extension 38 carries suitable bearings supporting the driving member 18. Member 36 is provided with suitable internal splines so that it may drive the shaft 40 connected to the load. The shaft 40 is provided with an extension 42 which serves to pilot the assembly and has its inner end journalled in bearings 44 received within the coupling 24. To the opposite ends of the member 18 are secured cup-like members 46 having outwardly extending annular flanges 48 provided with a series of spaced openings 50. To the member 36 are secured annuli 52 having similar outwardly extending annular flanges 54 provided with openings 56 corresponding to the openings 50 in the flanges 48. The openings 50 and 56 in the flanges 48 and 54 are normally out of alinement. To permit of adjustment of the discs to accomplish this result the member 18 is provided with studs 60 passing through openings in the members 46 and the members 46 are equipped with set screws 62 to permit of their circumferential adjustment on the driving member. When the adjustment has been made the clamping bolts 64 are tightened to lock the members in position. The openings 50 and 56 in flanges 48 and 54 on one side of lamp 70 are designed to come into registration upon relative movement of members 18 and 36 in one direction and the openings 50 and 56 in flanges 48 and 54 on the other side of lamp 70 are designed to come into registration upon relative movement of members 18 and 36 in reverse direction. The perforated flanges 48 and 54 may be regarded as rotatable shutters cutting off the flow of light from the lamp.

The indicating apparatus is numbered 66 and includes a lighting chamber 67 positioned between the pairs of flanges 48, 54. The chamber is supported by cover 68 detachably secured to bracket 69 mounted on housing 16. Chamber 67 has its interior treated to form a good reflecting surface. Within the chamber is mounted a suitable light source such as incandescent bulb 70. The chamber 67 is provided at its sides with windows 72, preferably of frosted glass, so as to give evenly diffused lighting. The bracket 69 supports photoelectric cells 74, arranged opposite the windows 72, but on the other side of the shutters. In Figure 5 I have shown the edges of the openings 50 and 56 beveled as well as rabbeted. This is done in order to prevent light from passing from the lighting chamber to the photoelectric cell by reflection from the edges of the openings. I have shown an indicating instrument 80 connected to the cells in such a way that the current passing through one of them causes the needle to move in one direction, while current passing through the other causes the needle to move in the opposite direction. This may be accomplished in any known manner.

In the operation of the device the engine 10 drives the member 18 through shaft 24 and coupling 22, and the member 18 drives member 36 through springs 30. Owing to the resistance of the load and the turning force of the engine the springs 30 will be compressed, causing the flanges 48 and 54 to be displaced circumferentially with respect to each other, thereby bringing one set of openings 50 and 56 more or less into alinement, depending upon the amount of torque applied. The lamp 70 illuminates the frosted glass panes 72 quite evenly so that the amount of light passing through the alined openings 50 and 56 is proportional to their area. The openings 50 and 56 are cut with radial sides so that the area varies directly with the circumferential displacement of the flanges, and hence with the torque. The photoelectric cells 74 will consequently receive a volume of light dependent upon the torque and hence the indicator 80 will give readings proportional to the torque. Since the set of openings 50 and 56 at one side of the lamp 70 is designed to come into alinement upon relative movement of members 18 and 36 in one direction and the other set of openings 50 and 56 on the other side of lamp 70 is designed to come into alinement upon relative rotation of members 18 and 36 in the opposite direction, but one photoelectric cell 74 will come into action at a time, and the cells give reverse indications on the indicator 80.

Obviously, my indicator may be employed to measure other things than torque. It is characterized by the employment of relatively movable shutters whose degree of alinement varies with the force or movement being measured, in combination with an arrangement for projecting light through the shutters and measuring the amount of light passing through them.

I claim:

1. In a force or motion measuring device, the combination of a pair of spaced photoelectric cells, a light source between said cells, a pair of movable shutters arranged in succession between the source and each of said cells so as to intercept light passing from the source thereto, each of said shutters having a series of openings therein, said openings being positioned in the shutters so that the openings of one series of each pair may be brought into registration with the openings of the other series of such pair by relative movement of the shutters to permit passage of light from the source to the cells, means for producing relative movement of one shutter of each pair with respect to the remaining shutters to thereby vary the amount of light passing to said cells, and means for indicating the amount of electrical energy generated in said cells by the light striking them.

2. In a force or motion measuring device, the combination of a pair of spaced photoelectric cells, a light source between said cells, a pair of movable shutters arranged in succession between the source and each of said cells so as to intercept light passing from the source thereto, common driving means for the inner shutters of said pairs, common driving means for the outer shutters of said pairs, each of said shutters having a series of openings therein, said openings being positioned in the shutters so that the openings of one series of a pair will be brought into registration with the openings of the other series of such pair upon relative movement of said driving means in one direction, and the openings of one series of the other pair will be brought into registration with the openings of the other series of such pair upon relative movement of said driving means in the opposite direction, thereby permitting light to pass from the source to the cell, and means for measuring the electrical energy produced by the light striking the cell.

EDWARD J. MARTIN.